Jan. 25, 1966   E. L. ANDERSON   3,230,794
VEHICLE THROTTLE DEPRESSOR
Filed Jan. 7, 1965
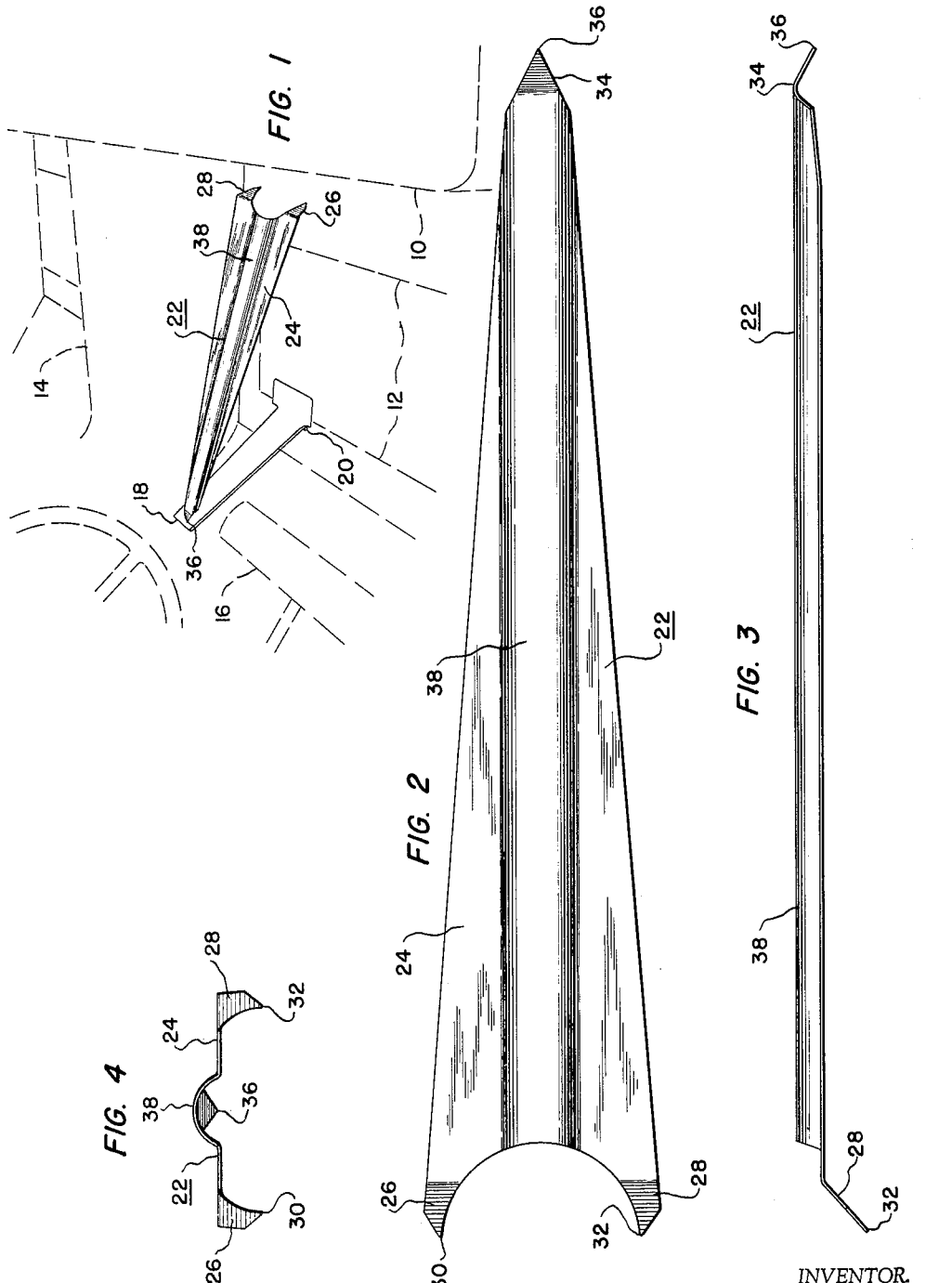
INVENTOR.
ERVIN L. ANDERSON
BY
ATTORNEY 3,230,794
VEHICLE THROTTLE DEPRESSOR
Ervin L. Anderson, 3030 Oceanside Blvd.,
Oceanside, Calif.
Filed Jan. 7, 1965, Ser. No. 423,967
5 Claims. (Cl. 74—532)

This invention relates to a vehicle throttle depressor and more particularly to an integral, rigid device for holding the foot-actuated, throttle pedal of any vehicle to any desired depressed position, and which device can be easily and quickly removed or moved to a new non-slip position thereby varying the degree of depression of the throttle pedal.

It is well known that almost all vehicles, such as automobiles, trucks, tractors and the like, use a manually operated foot throttle for controlling the rate of operation of he vehicle's engine or prime mover. There are also many well known times when it is advantageous, if not necessary, to have the manually operated foot throttle depressed a given amount and held in this depressed condition for a period of time without having an operator in the vehicle with his foot on the throttle. These times arise in many situations, such as for example, where it is desirable in a car lot for a single attendant to periodically "warm up" the engines of a group of automobiles simultaneously to keep their batteries charged and to keep their engines in good running condition. For the attendant to have to sit in each automobile and "warm up" the engine individually by depressing the throttle with his foot would be very time consuming. Yet, without a vehicle throttle depressor, such as is in this invention, that is quick and easy to use, then this or a similar amount of effort will be required to accomplish the task. Further, in cold climates it is advantageous to warm up the engine of the automobile as well as its interior prior to driving the car. To require a person to sit in the automobile and accomplish this "warming up" can be very distasteful to the person. Still further in automobile repair shops it is generally advantageous to the repairman to be able to hold the foot throttle to a predetermined amount of depression while the repairman is free to work on the engine or other parts of the automobile. There was a time when vehicles such as automobiles and trucks were equipped with push-pull hand throttles. These throttles could be set to run the engine at a given rate of speed. However, even these hand throttles had a tendency to allow the engine to gradually slow down. So even then a positive non-slip quickly usable throttle depressor would have been advantageous.

It is thus obviously advantageous to have a vehicle throttle depressor that has a rugged construction, functions in a simple manner, is quickly and easily used to depress a vehicle throttle to any of an infinite number of distances and that will hold a given depressed throttle position without attention. There are prior art devices that are capable of depressing the manually operated throttle pedal of a vehicle. These devices take many different forms, but in the main they are complicated in construction and use and unstable in operation. This is particularly true when considering the simple function to be accomplished. Also the prior art devices have parts that often must be correctly manipulated and that are of a non-rigid construction or operation.

It is therefore an object of this invention to provide an improved vehicle throttle depressing device that depresses and holds any vehicle's manually operable throttle a predetermined amount.

It is another object of this invention to provide an improved vehicle throttle depressor that is economical to manufacture, rigid in construction and durable in use.

It is another object of this invention to provide an improved vehicle throttle depressor that is easily and quickly placed in use.

It is another object of this invention to provide an improved vehicle throttle depressor that holds the vehicle throttle in a predetermined, stable, non-slipping position.

The vehicle throttle depressor of this invention comprises a rigid substantially flat device having at least two projection points or floor board engaging projection means for contacting the floor of a vehicle with a non-slip engagement. The device has another projecting point or throttle engaging projection means integral with the aforesaid for contacting with a non-slip engagement the vehicle throttle. This wedges the vehicle throttle depressor between the floor board of the vehicle and the vehicle throttle, depressing the throttle an amount determined by the particular place of contact of the "at least two projection points" on the floor board and the point of contact of the other projection point on the vehicle throttle. The invention may have a configuration substantially resembling an isosceles triangle wherein the corners of the base of the triangle comprise the floor board engaging projection means and the apex point of the isosceles triangle being the point that contacts the throttle pedal of the vehicle. The invention also advantageously has the two points of the depressor that contact the floor board project downwardly at an acute angle from the depressor. This provides a better angle of contact for the projection points against the floor board of the vehicle thus assuring a non-slip engagement. Because of its general triangular shape and the at least two point contact with the floor board of the vehicle, the depressor device has very good stability. This is especially true when the line intersecting the two points of contact lays normal to the line of pivoted movement of the throttle pedal. It is also readily seen that the depressor device may be fixed to any point of contact with the floor board surface, and may be rotated to account for inclined floor board surfaces. While it is of course desirable in achieving stability to place the floor board engaging points at a position substantially normal to the line of pivotal movement of the throttle, it should be recognized that the device may engage the floor board surface in an angular position to the foot throttle and still maintain a substantially stable condition of throttle depression. Thus the foot throttle depressor device of this invention is extremely easy to install and does not require painstaking adjustment to obtain the desired throttle depression.

It should further be recognized that while the points of projection of this invention that engage the vehicle's floor board are not limited to two and may be several in number, the two projection points have the advantage of being quickly and easily installed and adjusted to provide good stability in depressing the vehicle throttle.

FIGURE 1 shows the interior of an automobile (shown in phantom) in which a specific embodiment of the vehicle throttle depressor of this invention is shown in the operative position.

FIGURE 2 is a top view of the specific embodiment of this invention.

FIGURE 3 is a side view of the specific embodiment of this invention.

FIGURE 4 is an end view of the specific embodiment of the invention.

Referring now to the drawings wherein like reference numerals represent like and corresponding parts throughout the several views, there is shown in phantom the interior of a normal, modern automobile having a seat 10 with a floor board 12 and the raised transmission hump 14. A brake pedal 16 and a manually operable foot throttle pedal 18 are shown in their position raised from the floor board 12. The foot throttle pedal 18 projects longitudinally upward at a substantially obtuse angle with the open surface of the floor board 12 and may be pivoted about its hinge connection 20. The foot actuated throttle is spring biased in the normal manner and may be moved by the foot around hinge 20 to coact with a linkage mechanism (not shown) connected to the vehicle engine. The floor board 12 may have any of the well known surfaces, such as a rubber mat construction or a rug.

The specific embodiment of the vehicle throttle pedal depressor 22 shown in the operating position in FIGURE 1, which may be made of steel or other suitable rigid materials, comprises, a substantially flat member 24, see FIGURES 2, 3 and 4, that has a triangular shape. The triangular shape is elongated and takes the general form of an isosceles triangle. Passing along substantially the length of the triangular shaped member is a raised or curved center portion 38 that provides rigidity and strength to the elongated member while permitting a relatively light and thin gauge construction. At the base of the triangular shaped member there are two projections 26 and 28. As can be seen in FIGURE 3, these projections angle downwardly from the base member 24 at an acute angle. The floor engaging points 30 and 32 are pointed to assure non-slipping contact with the floor board that is required to depress the throttle against its spring bias.

At the other end of the member 22 is projection that is also angled downwardly and sharpened to a point 36 for non-slipping engagement with the vehicle throttle 18. Point 36 while sharpened is still blunted sufficiently to maintain its position of contact with the vehicle throttle without marring its surface. The portion angled downward also affords the correct angle of contact between point 36 and the throttle pedal 18. It is the intent of the specification wherever the word "throttle" alone is used, to mean in fact "throttle pedal."

In operation, the operator starts the engine of the vehicle and may depress the vehicle engine throttle 18 either by hand or by his foot. He depresses the throttle 18 that distance required to obtain the desired engine operating speed and then the vehicle throttle depressor of this invention 22 (see FIGURE 1) is placed in contact wih the floor board 12 and with the foot throttle 18 and wedged therebetween. The engine will then idle unattended until the engine is turned off or the throttle depressor removed. To remove the vehicle throttle depressor, it is merely necessary to either raise the device or push the foot throttle down with foot or hand and lift the device from the floor of the automobile. As can be seen, the vehicle throttle depressor is so easy to install that it can be installed by the operator while sitting on seat 10.

Although only the preferred embodiment of the invention has been shown and described herein, it is not to be construed that the invention is limited thereto, as numerous modifications will be apparent to those skilled in the art; and the invention is to be given its broadest interpretations within the terms of the following claims.

What I claim is:

1. In a vehicle having a hinged foot throttle pedal and a floor board positioned immediately adjacent said throttle pedal and at an angle thereto, a rigid elongated integral member, said member having at least two floor board engaging projection means projecting at an acute angle downwardly from said substantially flat member for engaging said floor board, said member having at the end of said elongated portion opposite said floor board engaging projection means a throttle pedal engaging projection means for engaging the surface of said throttle pedal, said member being capable of being wedged between said engagement with said floor board and said throttle pedal for depressing said throttle pedal, and said floor board engaging projection means being capable of being releasably fixed to any point of contact with said floor board and said throttle pedal engaging projection means being capable of being releasably fixed at any point of contact with said throttle pedal thereby providing a nonslip contact for infinite variation of the throttle pedal depression.

2. In a vehicle having a hinged foot throttle pedal and a floor board positioned immediately adjacent said throttle pedal and at an angle thereto, a rigid substantially flat elongated integral member having an isosceles triangular shape, said member having a semi-circular strengthening ridge running the length of said elongation from a point midway between two corners of said member to a third corner of said member, each of said two corners having floor board engaging projection means projecting at an acute angle downwardly from said substantially flat member for engaging said floor board, said third corner having throttle pedal engaging projection means extending at an angle downwardly for engaging the surface of said throttle pedal, said member being capable of being wedged between said engagement with said floor board and said throttle pedal for depressing said throttle pedal, and said floor board engaging projection means being capable of being releasably fixed to any points of contact with said floor board and said throttle pedal engaging projection means being capable of being releasably fixed at any point of contact with said throttle pedal thereby providing a nonslip contact for infinite variation of the throttle pedal depression.

3. In a vehicle having a hinged foot throttle pedal and a floor board positioned immediately adjacent said throttle pedal and at an angle thereto, a rigid substantially flat elongated integral member, said member having at least two floor board engaging projection means projecting at an acute angle downwardly from said substantially flat member for engaging said floor board, said member having at the end of said elongated portion opposite said floor board engaging projection means a throttle pedal engaging projection means extending at an angle downwardly for engaging the surface of said throttle pedal, said member having a semi-circular strengthening ridge running the length of said elongation from a point midway between said two floor board engaging projection means to said throttle pedal engaging projection means, said member being capable of being wedged between said engagement with said floor board and said throttle pedal for depressing said throttle pedal, and said floor board engaging projection means being capable of being releasably fixed to any points of contact with said floor board and said throttle pedal engaging projection means being capable of being releasably fixed at any point of contact with said throttle pedal thereby providing a non-slip contact for infinite variation of the throttle pedal depression.

4. In a vehicle having a hinged foot throttle pedal and a floor board positioned immediately adjacent said throttle pedal and at an angle thereto, a rigid substantially flat elongated integral member, said member having at least two floor board engaging projection means projecting at an acute angle downwardly from said substantially flat member for engaging said floor board, said member having at the end of said elongated portion opposite said floor board engaging projection means a throttle pedal engaging projection means extending at an angle downwardly for engaging the surface of said throttle pedal, said member being wedged between said engagement with said floor board and said throttle pedal for depressing said throttle pedal, and said floor board engaging projection means being releasably fixed to any point of contact with said floor board and said throttle pedal engaging projection means being releasably fixed at any point of contact with said throttle pedal thereby providing a non-slip contact for infinite variation of the throttle pedal depression.

5. An elongated rigid vehicle throttle depressing device having a substantially flat shape with a semi-circular ridge running the length thereof for being placed in a vehicle and wedged between the floor of said vehicle and the throttle pedal of said vehicle and depressing the throttle pedal a predetermined amount, said device having at least two spaced apart projection means extending downwardly at an acute angle from said device and having floor board engaging points at the extremity thereof for engaging said floor of said vehicle and becoming releasably fixed thereto, said device having another projection means extending downwardly at an angle from said device and having a throttle pedal engaging point at the end thereof for engaging said throttle pedal and becoming releasably fixed thereto, and said points of said projection means being capable of engaging said floor and said throttle pedal at any points of contact thereby giving an infinite variation in the predetermined amount of throttle depression.

References Cited by the Examiner

UNITED STATES PATENTS

| | | | |
|---|---|---|---|
| 1,039,367 | 9/1912 | Dehn | 248—302 X |
| 1,448,105 | 3/1923 | Bell | 74—532 |
| 1,596,834 | 8/1926 | Herbert et al. | 74—532 |
| 2,695,946 | 11/1954 | Vandal | 74—562.5 |
| 2,866,356 | 12/1958 | Elam | 74—532 |
| 3,082,641 | 3/1963 | Leiter | 74—532 |
| 3,168,277 | 2/1965 | Stewart. | |

FOREIGN PATENTS 356,325  9/1931  Great Britain.

OTHER REFERENCES

"Popular Science," May 1959, page 199.

BROUGHTON G. DURHAM, *Primary Examiner.*

MILTON KAUFMAN, *Examiner.*

C. F. GREEN, *Assistant Examiner.*